Dec. 4, 1928.

S. JENCICK 1,694,064

FLEXIBLE COUPLING

Original Filed Dec. 3, 1923   3 Sheets-Sheet 1

Inventor
Stephen Jencick
By Brockett, Hyde + Milburn
Attorneys

Dec. 4, 1928.

S. JENCICK 1,694,064

FLEXIBLE COUPLING

Original Filed Dec. 3, 1923    3 Sheets-Sheet 2

Inventor
Stephen Jencick
By Brockett, Hyde & Milburn
Attorneys

Dec. 4, 1928.

S. JENCICK 1,694,064

FLEXIBLE COUPLING

Original Filed Dec. 3, 1923    3 Sheets-Sheet 3

Inventor
Stephen Jencick
By Brockett, Hyde + Milburn
Attorneys

Patented Dec. 4, 1928.

1,694,064

UNITED STATES PATENT OFFICE.

STEPHEN JENCICK, OF CHAGRIN FALLS, OHIO.

FLEXIBLE COUPLING.

Application filed December 3, 1923, Serial No. 678,288. Renewed October 11, 1928.

This invention relates to improvements in flexible couplings especially adapted for use in drive shafts of automobiles.

The objects of this invention are to provide an improved flexible coupling embodying a flexible disk which is free of bolt holes so as to reduce wear; to provide such a coupling with means for centralizing the flexing action at a single point corresponding to the center of the disk; to provide such a coupling with increased bearing surface area for the spider arms which connect the coupling to adjacent ends of shaft sections, and more specifically to provide such bearing surfaces in the form of ribs extending substantially radially of the disk.

A further object of this invention is to provide an improved means of connection between the spider and the end of the shaft section.

Further objects of this invention are to provide an improved form of disk which is built up from flexible material and in which the several parts are provided with strong interlocking joints therebetween, and more specifically to provide such a disk in which the interlocking joints will serve as bearing surfaces for clamping engagement between the spiders.

Other objects of this invention will appear from the following description and claims when considered together with the accompanying drawings.

Figure 1:
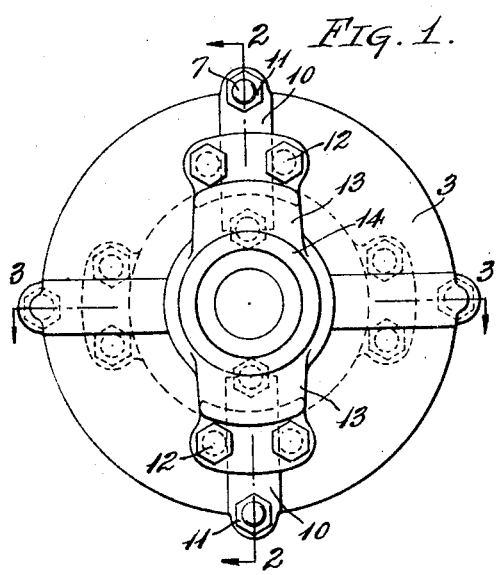
Figure 2:
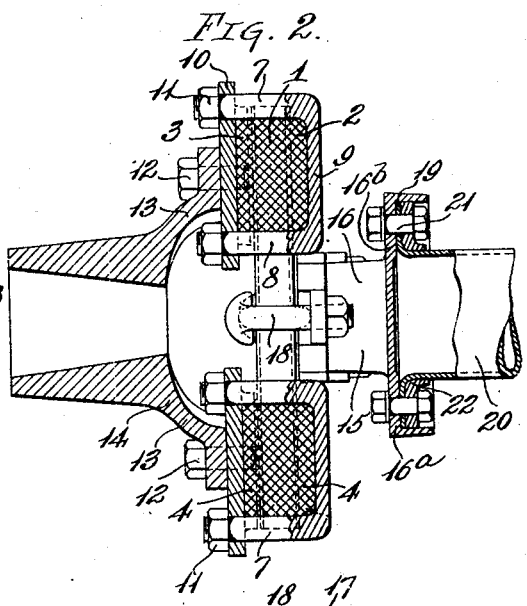
Figure 4:
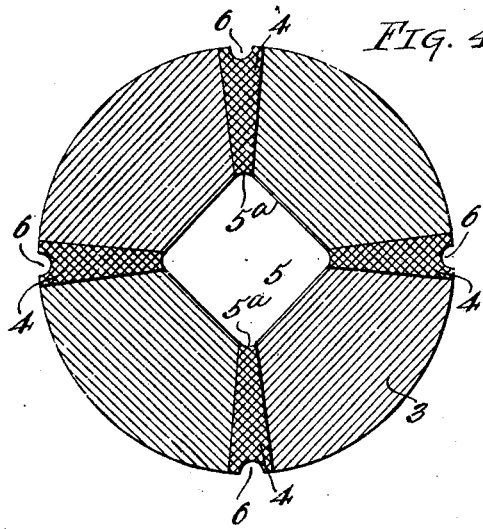
Figure 3:
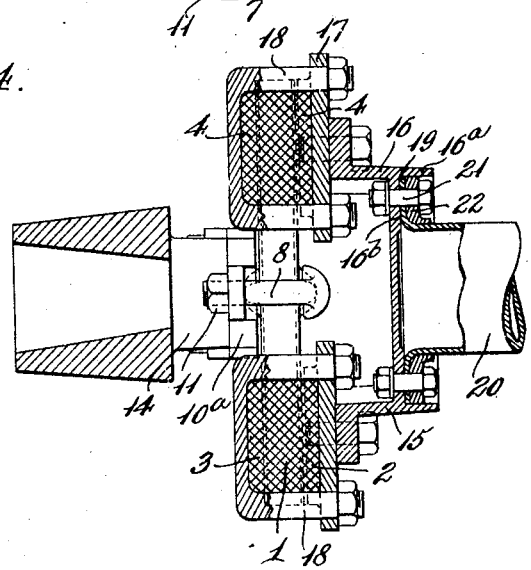
Figure 5:
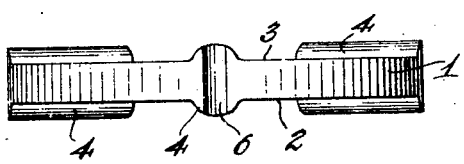
Figure 6:
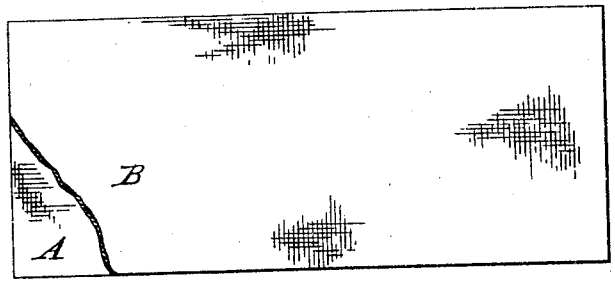
Figure 7:
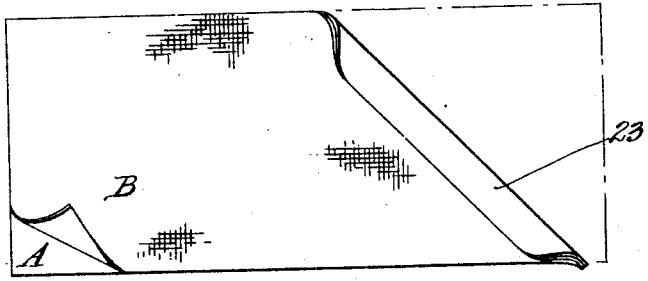
Figure 9:
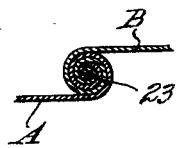
Figure 8:
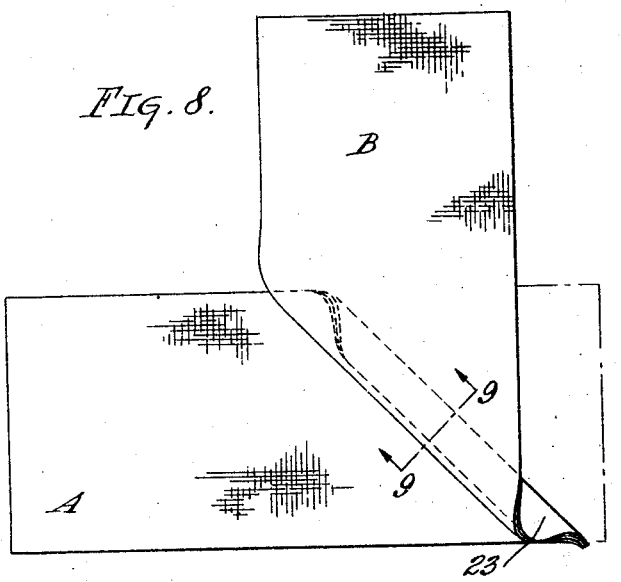
Figure 10:
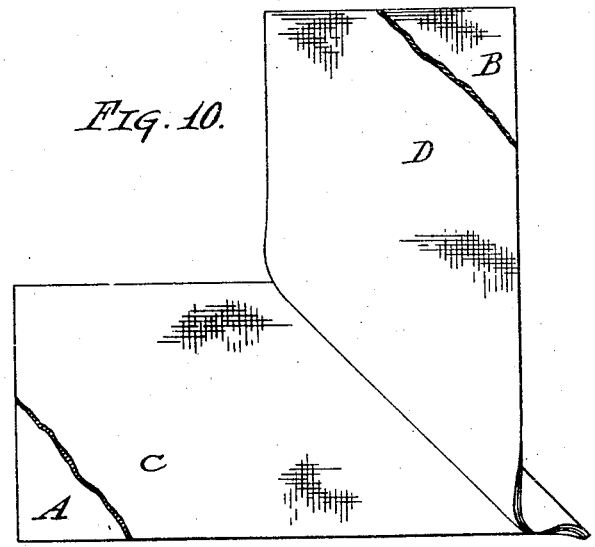
Figure 11:
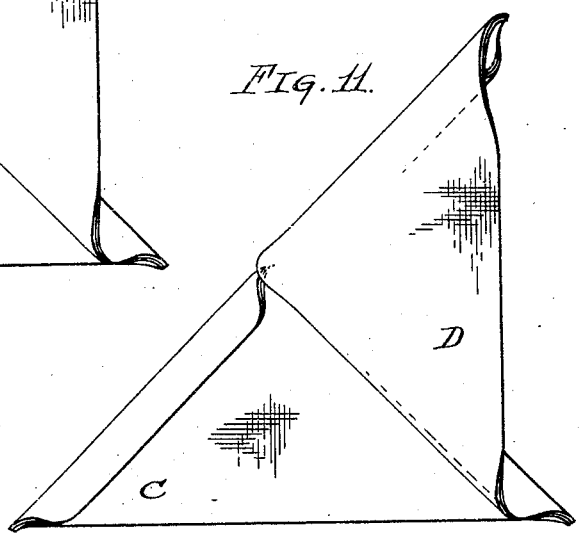
Figure 12:
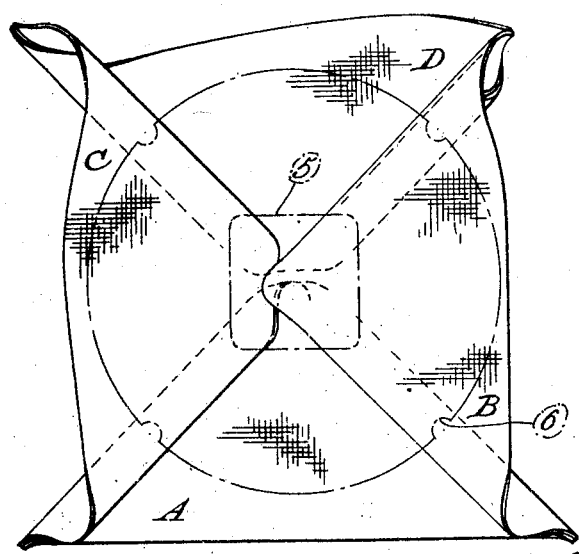

Fig. 1 shows my improved coupling in end elevation; Fig. 2 is a section on line 2—2, Fig. 1; Fig. 3 is a section on line 3—3, Fig. 1; Fig. 4 is a plan view of the flexible disk with the cords of the flexible material indicated thereon; Fig. 5 is an edge view of the flexible disk; Figs. 6 to 12 inclusive illustrate the successive steps followed in forming up my improved flexible disk, Fig. 9 being a section taken on line 9—9, Fig. 8.

The flexible disk, which may be formed of any suitable material such as rubberized fabric, is here shown as comprising three parts, namely the intermediate plain disk 1 and the outer ribbed disks 2 and 3. Although the material from which the disk is made is illustrated in Fig. 4 as consisting of cords extending tangentially along the lines of torsional strain, yet it is to be understood that these disks may be made up of woven fabric cut either on the square or on the bias. The particular method of forming the disk will be later explained, it being sufficient now to state that the outer disks 2 and 3 are provided with the radially extending, curved ribs 4 arranged at 90° about the disk. It will be noted also that these ribs taper toward the center of the disk and that the side or marginal lines of the ribs intersect at the center of the disk. The disk is provided with the central opening 5 having its corners 5ª at the inner ends of the ribs 4 while the disk around its outer periphery is provided with the recesses 6 at the outer ends of the ribs. The recesses 6 and the corner portions 5ª of the central opening 5 are of suitable contour so as to accommodate the legs 7 and 8 respectively of the U-shaped bolts as clearly indicated in the figures of the drawing. The bottom portions 9 of the U-shaped bolts have their inner faces so curved as to snugly fit the ribs 4 for seating engagement therewith. The ribs on the other side of the disk are engaged by the plates 10 through which extend the arms 7 and 8 of the U-shaped bolts for clamping engagement therewith by means of the nuts 11, the plates 10 having their inner surfaces so formed as to snugly engage over the curved ribs 3 for seating engagement therewith. The plates 10 are provided with side ears 10ª to receive the bolts 12 which clamp thereto the arms 13 provided at diametrically opposite points on the spider 14. Proper clearance is allowed between the inner ends of bolts 12 and the disk. The spider 15 on the other side of the disk is likewise provided with diametrically opposed arms 16 clamped in the same manner to the plates 17 which in turn are clamped in seating engagement with the ribs 4 by means of the U-shaped bolts 18. The plates 17 have their inner faces curved according to the curvature of ribs 4. It will be observed that the arms 16 are arranged in staggered relation with respect to the arms 13 and that the flexible disk is provided upon both of its opposite faces with the ribs which as here illustrated are arranged at substantially 90°.

The spiders may be connected to the adjacent ends of the shaft sections in any suitable manner but I have illustrated in Fig. 3 an improved means of such connection. In this particular form the outer portion of the spider 16 is provided with the annular flange 16ª providing a seat portion 16ᵇ therewithin to receive the flange 19 of the tubular shaft section 20. The flange 16ª extends substantially normal to the seat portion 16ᵇ and serves to center the tubular shaft in effecting this connection and the parts are secured together by means of the bolts 21 which extend through registering bolt holes in the flange 19 and the seat portion 16ᵇ while an annular washer 22 is also provided.

In the method of forming my improved flexible disk I first form the outer portions 2 and 3 as duplicates which may be of any desired thickness. In forming the outer disks 2 and 3, I first superimpose two layers or any multiple of two, as for instance A and B illustrated in Fig. 6, and roll the corners at one end so as to form an angularly disposed interlocking roll 23. The free end portions, indicated in Fig. 7 as being curled one way from the other, are then spread open so as to occupy the position illustrated in Fig. 8. In case only two sheets of material should be used, then of course A and B will each represent a single layer; whereas if four sheets are used, then A and B will each indicate two such sheets and so on. I then take two duplicates, or in other words two sets of interlocked strips illustrated in Fig. 8, and superimpose one over the other in the manner shown in Fig. 10. I then roll together the corners of the free end portions of these superimposed strips in the manner illustrated in Fig. 11 and finally turn back the strips C and D so as to form a substantially rectangular disk illustrated in Fig. 12 with the four interlocking roll portions extending substantially diagonally and spaced substantially 90° apart. I then cut out of the substantially rectangular disk shown in Fig. 12 a circular disk with a central opening 5 and with the peripheral recesses 6 as indicated in skeleton form in Fig. 12 and illustrated in completed form in Fig. 4. One or more of such circular disks may then be placed upon the opposite sides of the central plain disk 1 and all of them so arranged and placed in a mould for the vulcanizing operation. In this way a composite disk comprising the three parts is formed and the disk in its final form can be recognized and identified as a unitary or integral body. During the vulcanizing step the rubber will fill all spaces between the several layers of fabric including the spaces in the rolls so as to form a solid flexible body. Preferably, sufficient rubber is provided in the mold to enable the ribs 4 to be given the tapering form illustrated in Fig. 4, with the sides or marginal lines of the ribs intersecting at substantially the center of the disk.

As above stated, any suitable material can be used for forming up these disks and any number of laminations may be employed. It is to be understood also that in forming the composite disk the central plain disk 1 may or may not be included as may be desired. In other words, the flexible disk may be made up exclusively of disks 2 and 3 by moulding the same together in the same manner as described above. The plain disk 1 however serves not only as a filler whereby it is possible to use a less number of disks or layers 2 and 3 in building up a composite disk, but the intermediate disk serves also as a cushioning means or backing for the radially extending ribs of the outer disks 2 and 3. It is to be understood also that the outer disks may be formed of any desired number of annular segments and likewise any desired number of ribs may be provided.

It will be seen that the rolled ribs serve as interlocking connections between the several strips of fabric and the clamping engagement of the spiders with the ribs ensures a very efficient form of disk from the stand point of durability. This is true first because the disk is made up of several sections thereby distributing the strain and furthermore because of the fact that the interlocking joints between the several sections are securely held together not only by the interlocking and vulcanizing of the same but also by the clamping engagement between the spiders. It is to be observed also that the flexing action which takes place will be along radii which correspond with the sides of the ribs, with the result that all of the flexing action takes place about a common center corresponding to the true center of the disk.

By virtue of the fact that my present improved disk is free of bolt holes, all of the strain and wear which have heretofore occurred at the bolt holes are avoided; and furthermore by increasing the bearing surface for the engagement of the disk between the spiders, and by centralizing the flexing action in the true centre of the disk, there is afforded a true universal joint and the efficiency as well as the length of life of the disk are greatly increased.

Having described my invention I claim:

1. A flexible coupling comprising a flexible disk having a central opening, and means for connecting said disk between adjacent ends of shaft sections so as to constitute a driving connection, said connecting means comprising a plurality of substantially U-shaped clamping bolts having one arm extending through said central opening and the other arm engaging the edge of the disk, with the middle portion thereof engaging one side of the disk, and other clamping members connecting the ends of said U-bolts and engaging the other side of the disk.

2. A flexible disk having a plurality of radially extending protuberances on opposite faces of the disk and a plurality of recesses in the outer periphery of the disk at the outer ends of said protuberances, said disk being also provided with a central opening, and means for connecting said disk between adjacent ends of shaft sections so as to constitute a driving connection, said connecting means comprising a plurality of substantially U-shaped clamping members each having its middle portion engaging a protuberance on one face of the disk and having clamping means on the free ends of its arms engaging a protuberance on the opposite face of the disk, each of said clamping members having one of its arms extending through the central opening of the disk and its other arm engaging in one of the peripheral recesses of the disk.

3. A flexible coupling comprising a flexible disk having protuberances extending radially on opposite sides thereof and tapering towards the center of the disk, and means for engaging said protuberances so as to constitute a driving connection between adjacent ends of shaft sections.

4. A flexible coupling comprising a flexible disk having radially extending protuberances on opposite sides thereof, said protuberances tapering towards the centre of the disk in such a manner that their sides projected intersect at the centre of the disk, and means for engaging said protuberances so as to constitute a driving connection between adjacent ends of shaft sections.

5. In a coupling device, a flexible disk comprising coextensive intermediate and outer layers, said intermediate layer being of substantially uniform thickness and said outer layers being provided with protuberances for clamping engaging between the adjacent ends of two shaft sections.

6. In a coupling device, a flexible disk comprising coextensive intermediate and outer layers, said intermediate layer being of substantially uniform thickness and said outer layers being provided with folded portions forming integral protuberances for clamping engagement between the adjacent ends of two shaft sections.

7. In a coupling device, a flexible disk having a central opening and composed of segments having their ends joined together by interlocking engagement and together forming an annulus.

8. In a coupling device, a flexible disk having a central opening and composed of segments having their ends joined together by interlocking engagement and together forming an annulus, said interlocking joints constituting protuberances for clamping engagement between suitable spiders.

In testimony whereof I hereby affix my signature.

STEPHEN JENCICK.